US011803868B2

(12) United States Patent
Hajian

(10) Patent No.: US 11,803,868 B2
(45) Date of Patent: Oct. 31, 2023

(54) SYSTEM AND METHOD FOR SEGMENTING CUSTOMERS WITH MIXED ATTRIBUTE TYPES USING A TARGETED CLUSTERING APPROACH

(71) Applicant: ORACLE INTERNATIONAL CORPORATION, Redwood Shores, CA (US)

(72) Inventor: Mohammad H. Hajian, Malden, MA (US)

(73) Assignee: Oracle International Corporation, Redwood Shores, CA (US)

(*) Notice: Subject to any disclaimer, the term of this patent is extended or adjusted under 35 U.S.C. 154(b) by 30 days.

(21) Appl. No.: 17/307,099

(22) Filed: May 4, 2021

(65) Prior Publication Data
US 2021/0256546 A1  Aug. 19, 2021

Related U.S. Application Data

(63) Continuation-in-part of application No. 14/963,858, filed on Dec. 9, 2015, now abandoned.

(51) Int. Cl.
*G06Q 30/0204* (2023.01)
*G06Q 30/0601* (2023.01)
(Continued)

(52) U.S. Cl.
CPC ........ *G06Q 30/0204* (2013.01); *B25J 9/1602* (2013.01); *G06Q 30/0633* (2013.01);
(Continued)

(58) Field of Classification Search
CPC ...... G06Q 10/06; G06Q 10/087; G06Q 30/02; G06Q 30/0203; G06Q 30/0204
See application file for complete search history.

(56) References Cited

U.S. PATENT DOCUMENTS

| | | | |
|---|---|---|---|
| 2002/0194056 A1* | 12/2002 | Summers | G06Q 99/00 703/10 |
| 2008/0147500 A1* | 6/2008 | Slaney | G06Q 30/0241 705/14.6 |

(Continued)

FOREIGN PATENT DOCUMENTS

| | | |
|---|---|---|
| JP | 2004213153 A | 7/2004 |
| JP | 2015146126 A | 8/2015 |

OTHER PUBLICATIONS

Yumi Park "A study of Market Segmentation Management in the Hotel Industry", Master of Science in Hotel and Tourism Management, Kyung Hee University, Seoul, Korea, 2005. (Year: 2005).*

(Continued)

*Primary Examiner* — Pan G Choy
(74) *Attorney, Agent, or Firm* — Kraguljac Law Group, LLC

(57) ABSTRACT

Systems, methods, and other embodiments are disclosed that are configured to segment customers using mixed attribute types. In one embodiment, a computerized data structure is read. The computerized data structure has numerical demographic attribute data, categorical demographic attribute data, and target attribute data that is associated with customers and is stored in a computerized memory. The numerical demographic attribute data and the categorical demographic attribute data are converted to a same numerical scale, based at least in part on the target attribute data, to form congruent attribute data in a format that is compatible with performing a cluster analysis on the congruent attribute data. The cluster analysis is performed on the congruent attribute data to generate segmented customer data representing a segmentation of the customers. The segmented customer data may be used to control at least one enterprise function performed by a computerized management system.

15 Claims, 13 Drawing Sheets

(51) Int. Cl.
 B25J 9/16 (2006.01)
 G06Q 10/087 (2023.01)
 G06Q 30/0202 (2023.01)
 G06Q 10/0631 (2023.01)
 G05B 19/042 (2006.01)

(52) U.S. Cl.
 CPC .. *G05B 19/042* (2013.01); *G05B 2219/25258* (2013.01); *G05B 2219/25268* (2013.01); *G06Q 10/0631* (2013.01); *G06Q 10/087* (2013.01); *G06Q 30/0202* (2013.01)

(56) References Cited

U.S. PATENT DOCUMENTS

| | | | |
|---|---|---|---|
| 2009/0132347 A1* | 5/2009 | Anderson | G06Q 30/02 |
| | | | 705/30 |
| 2012/0042339 A1* | 2/2012 | Kitts | H04N 21/25866 |
| | | | 725/35 |
| 2012/0066065 A1* | 3/2012 | Switzer | G06Q 30/0255 |
| | | | 705/1.1 |
| 2014/0067472 A1 | 3/2014 | Mayes et al. | |
| 2014/0180793 A1* | 6/2014 | Boal | G06Q 30/0251 |
| | | | 705/14.66 |
| 2015/0142521 A1 | 5/2015 | Aydin et al. | |
| 2015/0142580 A1 | 5/2015 | Aydin et al. | |
| 2016/0104220 A1* | 4/2016 | Stiernagle | G06Q 30/0601 |
| | | | 705/26.1 |
| 2016/0110442 A1 | 4/2016 | Williams et al. | |
| 2016/0132059 A1* | 5/2016 | Mason | G05D 1/0291 |
| | | | 701/28 |
| 2016/0189177 A1 | 6/2016 | Parpia et al. | |
| 2016/0189278 A1* | 6/2016 | Parpia | G06Q 30/0635 |
| | | | 705/26.81 |
| 2017/0043953 A1* | 2/2017 | Battles | G06Q 10/083 |
| 2017/0278047 A1* | 9/2017 | Welty | G06Q 10/087 |

OTHER PUBLICATIONS

"Online Retail: Service Quality Derivation, Market Segmentation and Organisational Analysis", by Nilall C. Piercy, PhD Thesis, Cardiff Business School, University of Wales. Sep. 2006. (Year: 2006).*

"Market Segmentation Using Perceived Constraints", by Jinhee Jun, Gerard T. Kyle, and Andrew J. Mowen. Proceedings of the 2007 Northeastern Recreation Research Symposium. (Year: 2007).*

"A purchase-based market segmentation methodology", by Tsai and Chiu, Industrial Engineering and Management Department, Yuan-Ze University, Taiwan, Republic of China. Expert Systems with Applications 27 (2004) pp. 265-276. (Year: 2004).*

"Multi-dimensional customer segmentation model for power system reliability worth analysis", by Dzobo et al., Department of Electrical Engineering, University of Cape Town, Rondebosch 7701, South Africa. Electrical Power and Energy Systems 62 (2014), pp. 532-539. (Year: 2014).*

Patent Cooperation Treaty (PCT) International Search Report and Written Opinion in co-pending PCT International Appl. No. PCT/US2016/065064 (International Filing Date of Dec. 6, 2016) dated Jan. 30, 2017 (11 pgs.).

JP Office Action dated Mar. 31, 2020 in co-pending JP Appl. No 2018-530015 (Intl. Filing Date of Jun. 8, 2018) (6 pgs).

1st IN Exam Report dated Dec. 14, 2020 in co-pending IN Appl. No. 201847015426 (Intl. Filing Date of Apr. 24, 2018) 7 pgs).

\* cited by examiner

| Occupation | Weight |
|---|---|
| Retired | 14.8 |
| Executive | 12.8 |
| Teacher | 11.1 |
| Other | 11.8 |
| Housewife | 11.6 |
| Employee | 12.2 |
| Student | 10.4 |

410

| Age | Weight |
|---|---|
| Young Adults | 8.3 |
| Young mid_aged | 10.6 |
| Older mid_aged | 17.2 |
| Elderly | 15.8 |

420

| Qualification | Weight |
|---|---|
| Diploma | 12.2 |
| Other | 11.8 |
| Below Average | 10.2 |
| Bachelor's Degree | 13.4 |

430

| Gender | Weight |
|---|---|
| M | 8.0 |
| F | 12.6 |

| Cluster | Age | | | |
|---|---|---|---|---|
| | Young Adults | Young mid_aged | Older mid_aged | Elderly |
| Overall | 12.2% | 60.7% | 22.2% | 4.9% |
| 1 | 13.3% | 62.3% | 19.9% | 4.4% |
| 2 | 9.5% | 58.1% | 26.4% | 5.9% |
| 3 | 9.0% | 53.6% | 31.2% | 6.2% |
| 4 | 7.4% | 51.3% | 34.9% | 6.4% |
| 5 | 5.2% | 45.1% | 42.2% | 7.6% |
| 6 | 4.5% | 25.4% | 58.2% | 11.9% |

820

830

| Cluster | Gender | |
|---|---|---|
| | M | F |
| Overall | 12.4% | 87.6% |
| 1 | 13.6% | 86.4% |
| 2 | 9.9% | 90.1% |
| 3 | 8.3% | 91.7% |
| 4 | 6.6% | 93.4% |
| 5 | 5.8% | 94.2% |
| 6 | 7.5% | 92.5% |

840

SYSTEM AND METHOD FOR SEGMENTING CUSTOMERS WITH MIXED ATTRIBUTE TYPES USING A TARGETED CLUSTERING APPROACH

CROSS REFERENCE TO RELATED APPLICATIONS

This disclosure claims the benefit of priority to U.S. patent application Ser. No. 14/963,858 filed Dec. 9, 2015, titled "SYSTEM AND METHOD FOR SEGMENTING CUSTOMERS WITH MIXED ATTRIBUTE TYPES USING A TARGETED CLUSTERING APPROACH", and assigned to the present assignee, which is incorporated by reference herein in its entirety.

BACKGROUND

Customer segmentation is the practice of dividing customers into groups that share similar characteristics relevant to marketing such as gender, age, education level, or spending habits. Retailers employ customer segmentation based on the idea that every customer has a different need, and that a customer can be better served by identifying and targeting groups with similar preferences.

Clustering analysis is a statistical technique which is used to classify a set of observations into mutually exclusive groups. Various algorithms exist to perform cluster analysis and differ significantly in their cluster construction process and in their efficiency. Clustering analysis can be used as a tool to identify customer segments with similar purchase behavior to extract additional revenue from customers. For example, the results of a 1 to 10 point-based satisfaction survey about different aspects of customer shopping experience can be clustered to identify customer segments with similar attitudes toward a retailer.

Demographic segmentation is a common strategy in which customers are grouped based on demographic attributes such as age, gender, education, and income level. One major challenge in the segmentation process is the existence of different attribute types among demographic attributes. The two common types of attributes are numerical and categorical. Numerical attributes are attributes with numeric values that can be placed in ascending or descending order. Household size, age, and income level are examples of numerical attributes. Categorical attributes are attributes with no intrinsic ordering to their values. For example, education, race, and gender are examples of categorical attributes.

Using clustering is not always the desired option in segmenting customers as clustering is a method to discover unseen patterns in data. Customer segments are typically derived according to predefined targets and thus classification methods are more suited for targeted segmentation. However, classification requires the manual process of identifying/defining labeled clusters to use as the target. This process is often tedious and undesirable for a business user.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIGS. 4-12 illustrate examples of segmenting customers with mixed attribute types using a targeted clustering approach.

DETAILED DESCRIPTION

Systems, methods, and other embodiments are disclosed that identify clusters and segment data, which then may be used to control robotic inventory mechanisms based at least on selected segments.

In one embodiment, the present system converts both categorical and numerical attribute types into same-scale numerical attributes using a specified target attribute (e.g., sales amount). Embodiments enable any clustering algorithm that is compatible with numerical data (e.g., K-means) to efficiently identify clusters. The target attribute helps in deriving selected segments. Robotic inventory mechanisms may then be controlled based at least on the selected segments.

In accordance with one embodiment, both numerical and categorical attributes types are brought to the same comparable numerical dimension, making the attribute types consumable by many clustering algorithms. Sales data is used to compute weights for attribute values, which enables a clustering algorithm to behave like a classification algorithm without having to manually introduce cluster labels. A congruent measure is used for all types of attributes, enhancing the ability to handle both numerical and categorical attribute types efficiently. Using the same-scale input attributes improves the quality of customer segments and enables the clustering algorithm to identify customers in different tiers according to the target attribute.

The following terms are used herein with respect to various embodiments.

The term "item" or "retail item", as used herein, refers to merchandise sold, purchased, and/or returned in a sales environment.

The terms "period", "time period", "retail period", or "calendar period", as used herein, refer to a unit increment of time (e.g., a 7-day week) which sellers use to correlate seasonal periods from one year to the next in a calendar for the purposes of planning and forecasting. The terms may be used interchangeably herein.

The term "sales channel" or "location" or "retail location", as used herein, may refer to a physical store where an item is sold, or to an on-line store via which an item is sold.

The term "demographic attribute data", as used herein, refers to numerical and/or non-numerical data (e.g., categorical data) attributed to customers. For example, demographic attribute data may refer to age data, household size data, income level data, race data, gender data, and class data of customers.

The term "target attribute data", as used herein, refers to data associated with customers that is not demographic data. For example, target attribute data may refer to, for example, sales data (e.g., sales amounts) associated with customers.

Figure 1:
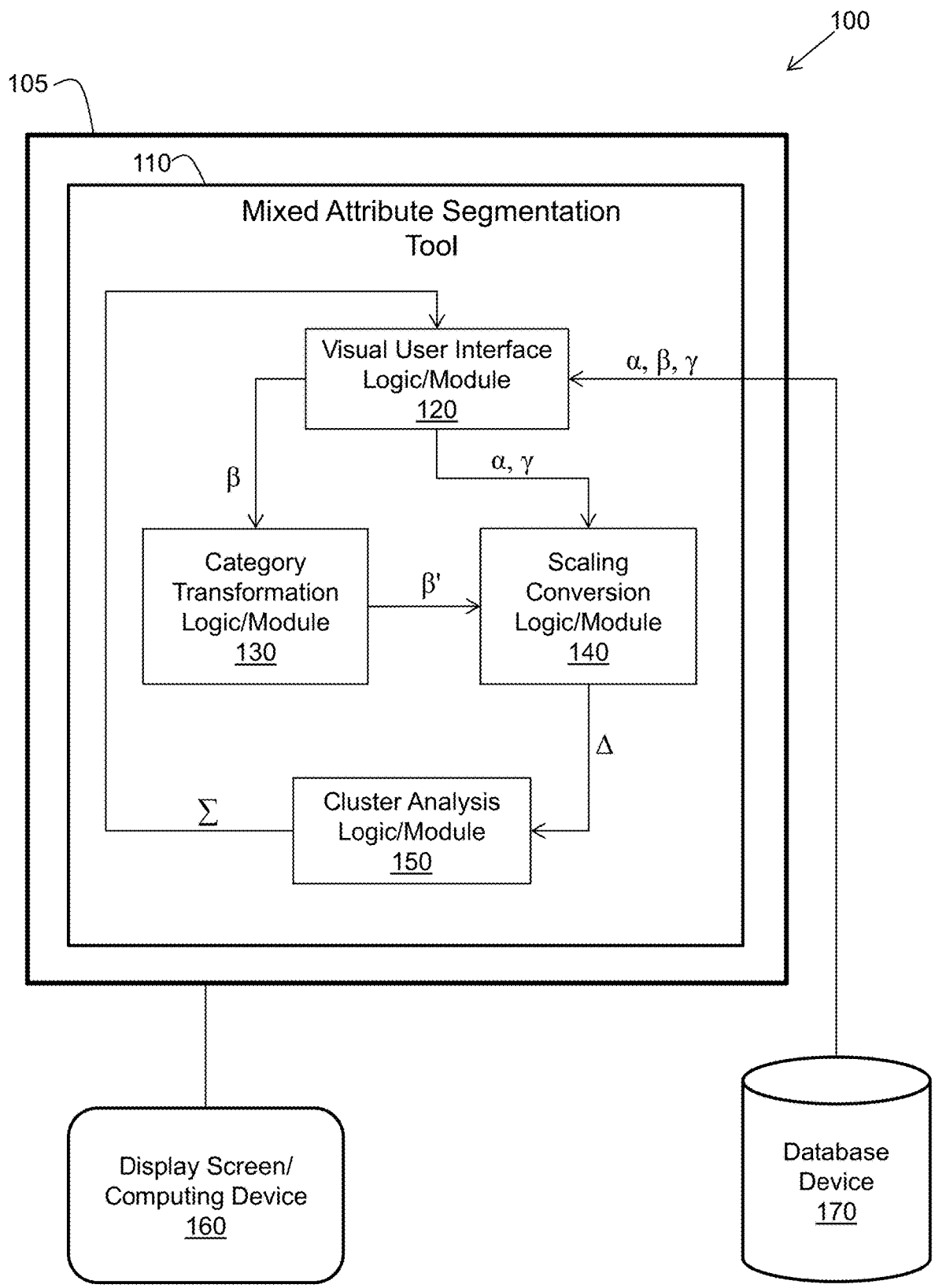
FIG. 1 illustrates one embodiment of a computer system, having a computing device configured with a mixed attribute segmentation module.

FIG. 1 illustrates one embodiment of a computer system 100, having a computing device 105 configured with a mixed attribute segmentation tool 110. For example, in one embodiment, the mixed attribute segmentation tool 110 may be part of a larger computer application (e.g., a computerized inventory management and demand forecasting application), configured to forecast and manage sales, promotions, and inventory for retail items at various retail locations based on customer demographics. The mixed attribute segmentation tool 110 is configured to computerize the process of segmenting customers based on a target attribute (e.g., sales amounts) using cluster analysis. The embodiments described herein take into consideration both numerical demographic attributes and categorical demographic attributes of customers in a same-scale manner.

The mixed attribute segmentation tool 110 is configured to computerize the process of analyzing data to generate segmented customer data. In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

In one embodiment, a computer algorithm is disclosed that implements an analytical approach for generating segmented customer data. It is assumed herein that both numerical and categorical demographic attribute data is available for use and that a cluster analysis model is employed as part of the segmentation process.

Customer segmentation can be an important driver of the supply chain and can greatly contribute to the accuracy of demand forecasts for retail items. If a forecast is inaccurate, allocation and replenishment perform poorly, resulting in financial loss for the retailer. Improvements in forecast accuracy for items may be achieved by the embodiments disclosed herein. Furthermore, a better understanding of the impact different segments of customers have on demand may be achieved. This helps the retailer to more effectively plan with respect to channel, pricing, promotions, and customer segments, for example.

With reference to FIG. 1, in one embodiment, the mixed attribute segmentation tool 110 is implemented on the computing device 105 and includes logics or modules for implementing various functional aspects of the mixed attribute segmentation tool 110. In one embodiment, the mixed attribute segmentation tool 110 includes visual user interface logic/module 120, category transformation logic/module 130, scaling conversion logic/module 140, and cluster analysis logic/module 150.

Other embodiments may provide different logics or combinations of logics that provide the same or similar functionality as the mixed attribute segmentation tool 110 of FIG. 1. In one embodiment, the mixed attribute segmentation tool 110 is an executable application including algorithms and/or program modules configured to perform the functions of the logics. The application is stored in a non-transitory computer storage medium. That is, in one embodiment, the logics of the mixed attribute segmentation tool 110 are implemented as modules of instructions stored on a computer-readable medium.

The computer system 100 also includes a display screen 160 operably connected to the computing device 105. In accordance with one embodiment, the display screen 160 is implemented to display views of and facilitate user interaction with a graphical user interface (GUI) generated by visual user interface logic 120 for viewing and updating information associated with generating segmented customer data. The graphical user interface may be associated with a mixed attribute segmentation application and visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 160 may represent multiple computing devices/terminals that allow users to access and receive services from the mixed attribute segmentation tool 110 via networked computer communications.

In one embodiment, the computer system 100 further includes at least one database device 170 operably connected to the computing device 105 and/or a network interface to access the database device 170 via a network connection. For example, in one embodiment, the database device 170 is operably connected to visual user interface logic 120. In accordance with one embodiment, the database device 170 is configured to store and manage data structures associated with the mixed attribute segmentation tool 110 in a database system (e.g., a computerized inventory management and demand forecasting application). The data structures may include, for example, records of numerical demographic attribute data, categorical demographic attribute data, and sales data associated with customers.

Referring back to the logics of the mixed attribute segmentation tool 110 of FIG. 1, in one embodiment, visual user interface logic 120 is configured to generate a graphical user interface (GUI) to facilitate user interaction with the mixed attribute segmentation tool 110. For example, visual user interface logic 120 includes program code that generates and causes the graphical user interface to be displayed based on an implemented graphical design of the interface. In response to user actions and selections via the GUI, associated aspects of generating segmented customer data may be manipulated.

For example, in one embodiment, visual user interface logic 120 is configured to facilitate receiving inputs and reading data in response to user actions. For example, visual user interface logic 120 may facilitate selection, reading, and inputting of demographic attribute data (a and R in FIG. 1) and sales data ($\gamma$ in FIG. 1) associated with customers. The demographic attribute data and the sales data may reside in data structures (e.g., within database device 170) associated with (and accessible by) a mixed attribute segmentation application (e.g., the mixed attribute segmentation tool 110) via the graphical user interface. The data may be read into data structures in a memory associated with visual user interface logic 120, for example. The generation of segmented customer data ($\Sigma$ in FIG. 1) may be based at least in part on both numerical demographic attribute data $\alpha$ and categorical demographic attribute data $\beta$.

Numerical demographic attribute data $\alpha$ may include, for example, data representing the age, household size, and income level of customers. Categorical demographic attribute data β may include, for example, data representing the race, gender, and social class of customers. Target attribute data γ may be associated with the customers as well. For example, in one embodiment, target attribute data γ includes sales data (e.g., sales amounts) associated with each customer. The target attribute data γ may be aggregated from retail periods of past weeks, with each past week having numerical values assigned to it to indicate the sales generated that week for each customer. The demographic attribute data (α and β) and the target attribute data γ for customers may be accessed via network communications, in accordance with one embodiment.

Furthermore, visual user interface logic 120 is configured to facilitate the outputting and displaying of segmented customer data Σ, via the graphical user interface, on the display screen 160. In one embodiment, cluster analysis logic 150 is configured to operably interact with visual user interface logic 120 to facilitate displaying of segmented customer data Σ of an output data structure. Furthermore, in one embodiment, category transformation logic 130 and scaling conversion logic 140 are configured to operably interact with visual user interface logic 120 to receive demographic attribute data (α and β) and target attribute data γ. In one embodiment, visual user interface logic 120 is configured to generate an electronic message that includes the segmented customer data Σ (or an aggregated version thereof). Furthermore, the visual user interface logic 120 is configured to transmit, via network communications, the electronic message to a remote computing system to cause the remote computing system to perform at least one enterprise function, as discussed later herein.

Referring again to FIG. 1, in one embodiment, category transformation logic 130 is configured to generate transformed demographic attribute data β' by transforming categorical demographic attribute data β of customers from a non-numerical form (e.g., text) to a numerical form. By transforming the categorical demographic attribute data β to a numerical form, the transformed demographic attribute data β' is in a form that is similar to the numerical demographic attribute data α which can be numerically processed. Details of performing the transformation are discussed herein with respect to at least the "Details of One Algorithmic Embodiment" section, the "Specific Example" section, and FIGS. 4-12.

The categorical demographic attribute data R may include data with respect to categories of race, gender, and social class, for example. Categories of race may include, for example, "white", "black", "Hispanic", and "Asian". Categories of gender may include, for example, "male", "female", and "transgender". Categories of social class may include, for example, "lower middle class", "middle class", and "upper class".

Referring again to FIG. 1, in one embodiment, scaling conversion logic 140 is configured to convert the numerical demographic attribute data α and the transformed demographic attribute data β' to a same numerical scale to form congruent attribute data Δ. The conversion is based on the target attribute data γ such as, for example, sales amounts of sales data for the customers. By converting the numerical demographic attribute data α and the transformed demographic attribute data β' to a same numerical scale, the congruent attribute data Δ is in a form that can be operated upon by a cluster analysis algorithm. Details of performing same-scale conversion are discussed herein with respect to at least the "Details of One Algorithmic Embodiment" section, the "Specific Example" section, and FIGS. 4-12.

In one embodiment, cluster analysis logic 150 is configured to perform a cluster analysis on the congruent attribute data to generate segmented customer data Σ. The segmented customer data Σ may segment customers according to, for example, profitability. For example, in one embodiment, a first cluster represented by the segmented customer data Σ may represent the most-profitable customers, a second cluster may represent moderately profitable customers, and a third cluster may represent the least-profitable customers. Details of performing cluster analysis are discussed herein with respect to at least the "Details of One Algorithmic Embodiment" section, the "Specific Example" section, and FIGS. 4-12.

In one embodiment, a cluster aggregation process may be performed on the segmented customer data (representing customer groups) to further combine like groups to form a final number of customer segments (a final number of groups). Cluster analysis logic 150 is configured to perform the cluster aggregation process. Details of performing cluster aggregation are discussed herein with respect to at least the "Details of One Algorithmic Embodiment" section.

In accordance with one embodiment, the segmented customer data Σ (either before or after aggregation) may be used to control at least one enterprise function performed by a computerized management system. For example, the computerized management system may be an enterprise resource planning (ERP) system or an inventory management and demand forecasting system. The enterprise function that is controlled may be, for example, an inventory allocation function, a demand forecasting function, or a market segmentation function.

Clustering analysis is not typically the desired option for segmenting customers, as clustering analysis is a tool to discover unseen patterns in data and segmentation is usually used to try to accomplish a defined goal. Therefore, in general, classification methods are more suited for targeted segmentation. However, classification requires the manual process of identifying predefined clusters to use as the target. This process is often tedious and is not desirable for a business user. The mixed attribute segmentation tool 110 uses target attribute data (e.g., sales data) to compute weights for attribute values. This enables a clustering algorithm to behave like a segmentation algorithm without having to manually introduce cluster labels.

In this manner, the mixed attribute segmentation tool 110 is configured to generate segmented customer data, based on target attribute data, using both numerical and categorical demographic attribute data for customers. Furthermore, a cluster analysis process is employed to segment customers according to the target attribute (e.g., sales amounts). A congruent measure is used for varied types of attributes, which enhances the ability to handle mixed attribute types simultaneously and efficiently.

In one embodiment as described in the following sections, the segmented customer data may be used to control robotic mechanisms and/or inventory machines to identify, retrieve, and move/transport selected items/products to destination locations (e.g., sales channels).

Figure 2:
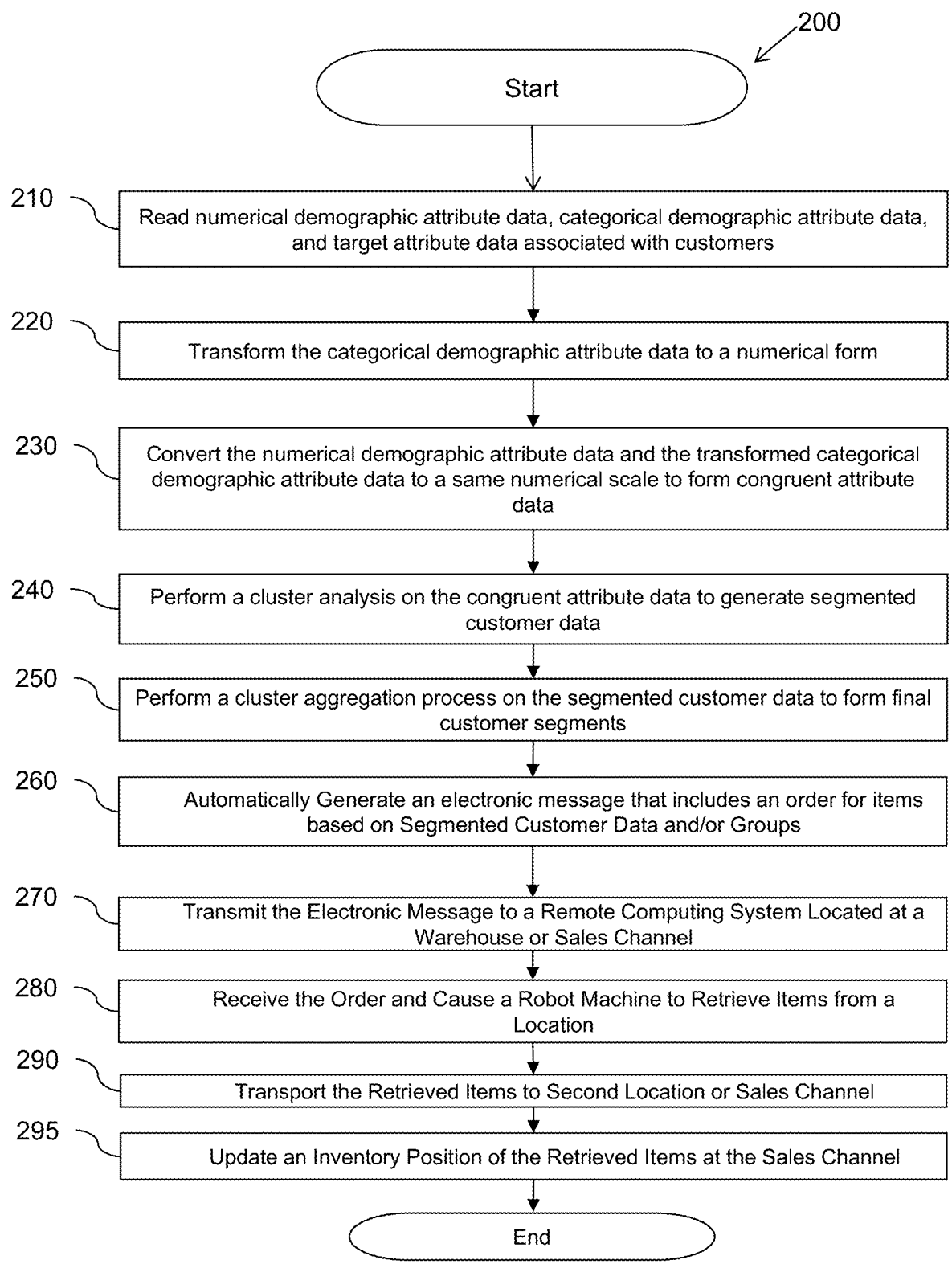
FIG. 2 illustrates one embodiment of a method, which can be performed by the mixed attribute segmentation module of the computer system of FIG. 1, for generating segmented customer data for subsequent transportation of items to a sales channel based upon the segmented customer data.

FIG. 2 illustrates one embodiment of a computer-implemented method 200, which can be performed by the mixed attribute segmentation tool 110 of the computer system 100 of FIG. 1, for generating segmented customer data. Method 200 describes operations of the mixed attribute segmentation tool 110 and is implemented to be performed by the mixed attribute segmentation tool 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that, for customers of a retail enterprise, demographic attribute data of multiple types and forms can be collected and analyzed to segment the customers based on a target attribute such as, for example, sales. The various types of demographic attribute data can be put into a similar form such that cluster analysis techniques can be used to segment the customers.

Demographic attribute data may include both numerical demographic attribute data and categorical demographic attribute data. It is assumed herein that the demographic attribute data and the target attribute data have been recorded for multiple customers that have purchased retail items of the retail enterprise in past retail periods (e.g., over 52 weeks of the past year). The demographic and target attribute data may be stored in the database device 170, for example. In accordance with one embodiment, the mixed attribute segmentation tool 110 is configured to read demographic and target attribute data for customers from at least one data structure (e.g., from data structures in the database 170).

Again, numerical demographic attribute data may include, for example, age data, household size data, and income level data associated with multiple customers. Categorical demographic attribute data may include, for example, race data, gender data, and social class data associated with the multiple customers. Target attribute data may include, for example, sales data having sales amounts for each customer of the multiple customers.

Upon initiating method 200, at block 210, numerical demographic attribute data, categorical demographic attribute data, and target attribute data that are associated with multiple customers are read from a computerized data structure stored in a memory. The reading may be performed by visual user interface logic 120 of the mixed attribute segmentation tool 110, in accordance with one embodiment. The attribute data may reside in and be read from a data structure stored in a memory of the computing device 105, for example. Alternatively, the attribute data may reside in and be read from a data structure stored in a memory of the database device 170. The attribute data may be read into a data structure associated with visual user interface logic 120, for example.

The attribute data (numerical demographic, categorical demographic, target) is associated with multiple customers. The categorical demographic attribute data (e.g., race, gender, social class) is typically in a different form (e.g., text) than the form (numeric) of the numerical demographic attribute data (e.g., age, household size, income level). Furthermore, the target attribute data, if sales data, is typically in numeric form (e.g., sales dollars and/or sales quantities).

Referring again to FIG. 2, at block 220, the categorical demographic attribute data is transformed from a non-numerical form (e.g., text) to a numerical form to generate transformed demographic attribute data. In one embodiment, the transformation of the categorical demographic attribute data is performed by category transformation logic 130 of mixed attribute segmentation tool 110. Details of performing the transformation are presented below herein under at least the "Details of One Algorithmic Embodiment" section.

At this point, the numerical demographic attribute data and the transformed demographic attribute data are both in numerical form. However, the numerical demographic attribute data and the transformed demographic attribute data may correspond to different numerical scales. The different numerical scales may be such that an algorithm (e.g., a cluster algorithm), desired to be used to operate upon the attribute data, may provide erroneous results due to the scale differences. Thus, another transformation or conversion is still in order.

Therefore, at block 230, the numerical demographic attribute data and the transformed demographic attribute data (being representative of the categorical demographic attribute data) are converted to a same numerical scale to form congruent attribute data. The congruent attribute data is in a format that is compatible with performing a cluster analysis on the congruent attribute data. In one embodiment, the conversion is performed by scaling conversion logic 140 of the mixed attribute segmentation tool 110. Weights required for conversion are computed based on the target attribute data (e.g., sales data), in accordance with one embodiment. The conversion includes normalizing values associated with the numerical demographic attribute data and the transformed demographic attribute data using the weights. This brings both attribute types (numerical and categorical) to the same comparable numerical dimension which can be operated upon by a clustering algorithm. Details of performing the conversion are presented below herein under at least the "Details of One Algorithmic Embodiment" section.

Cluster analysis is an analytical technique of grouping data that is representative of objects (e.g., customers) based on information within the data that characterizes the objects and the relationships between the objects. Ideally, groups formed by cluster analysis put similar or related objects in a same group, and put dissimilar or unrelated objects in different groups. The clustering of objects is more distinct when similarities are greater within groups and the differences are greater between groups.

Referring to FIG. 2, at block 240, a cluster analysis is performed on the congruent attribute data to generate segmented customer data representing a segmentation of the customers into groups. In one embodiment, the cluster analysis is performed by a cluster algorithm implemented by cluster analysis logic 150 of the mixed attribute segmentation tool 110. At block 250, a cluster aggregation process is performed on the segmented customer data (representing customer groups) to combine like groups to form a final number of customer segments (a final number of groups). In one embodiment, the aggregation process of block 250 is performed by cluster analysis logic 150.

In accordance with one embodiment, the aggregation process includes calculating a customer profile for each segment of customers from block 240, performing a cluster analysis on the profiles, and merging the segments of customers based on the cluster analysis to form aggregated clusters. That is, the cluster aggregation process merges customer segments from block 240 having like customer profiles. Details of performing block 240 and block 250 are presented below herein under at least the "Details of One Algorithmic Embodiment" section.

Figure 3:
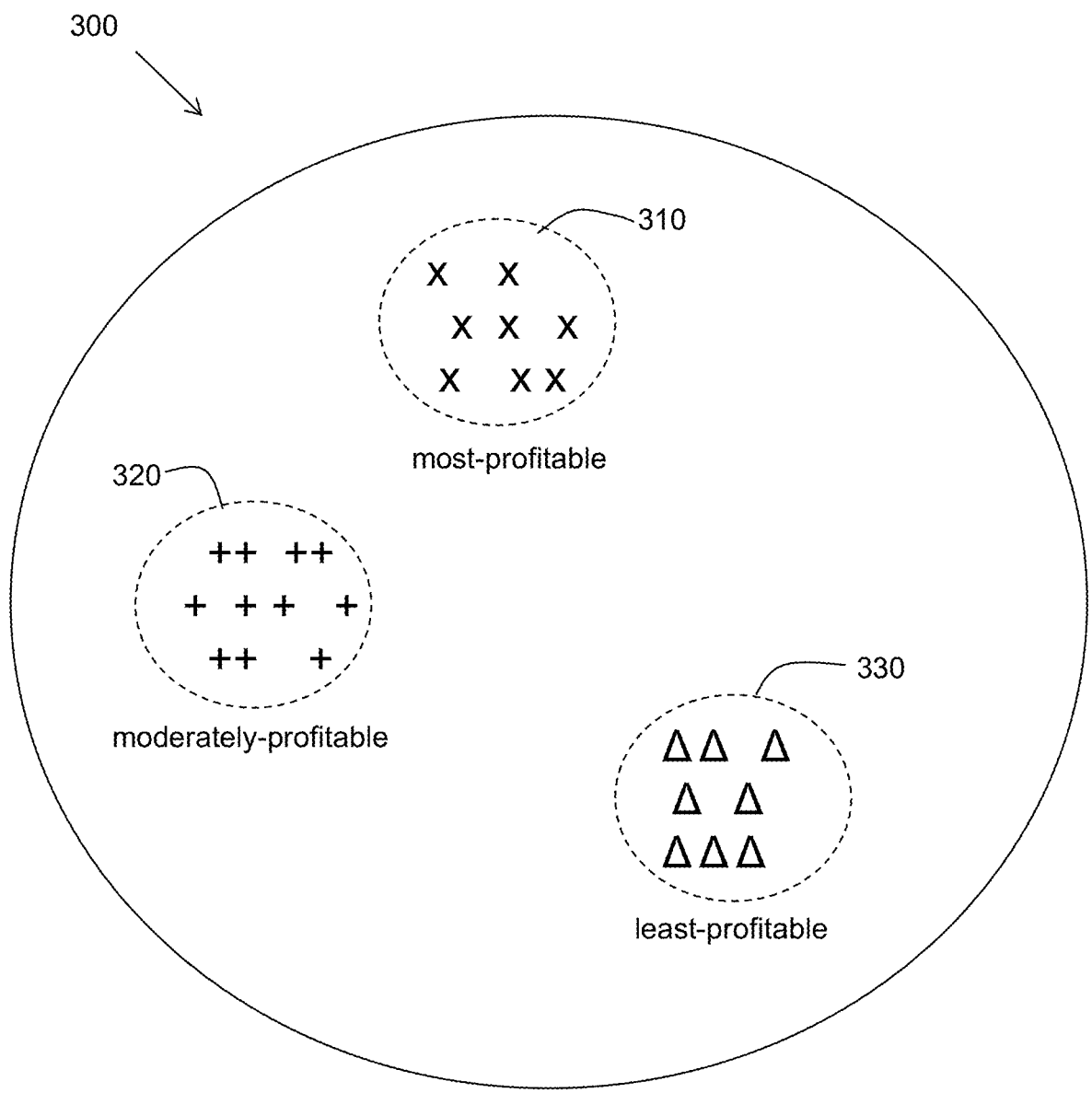
FIG. 3 graphically illustrates an example embodiment of segmented customer data generated by the method of FIG. 2.
Figure 5:
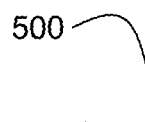
Figure 6:
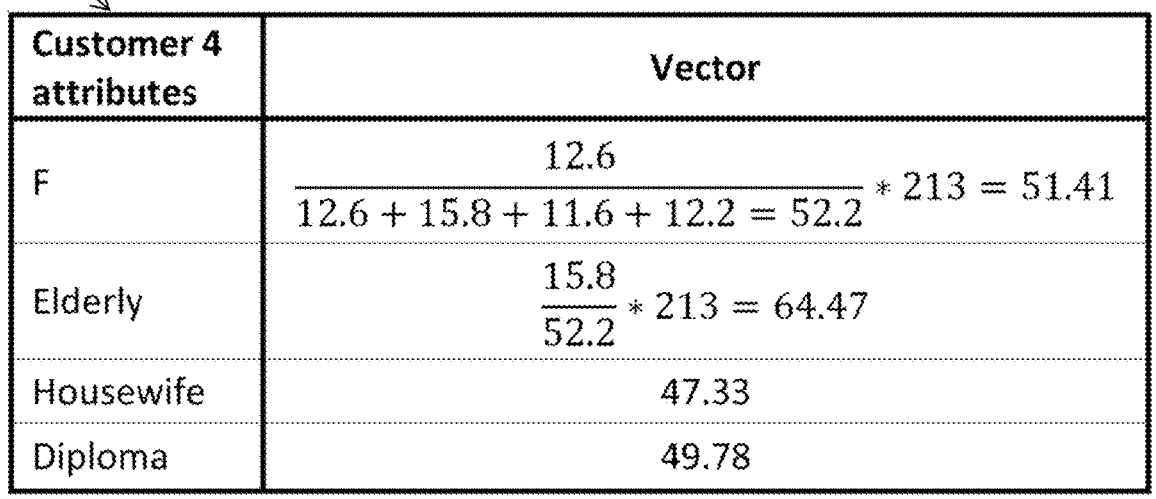
Figure 7:
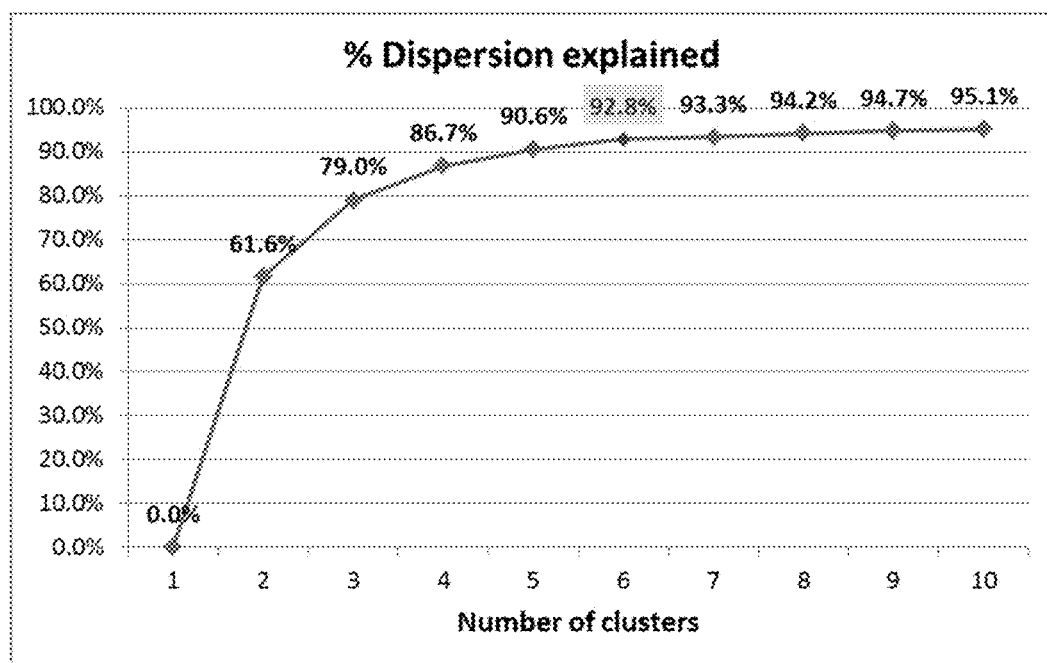
Figure 8:
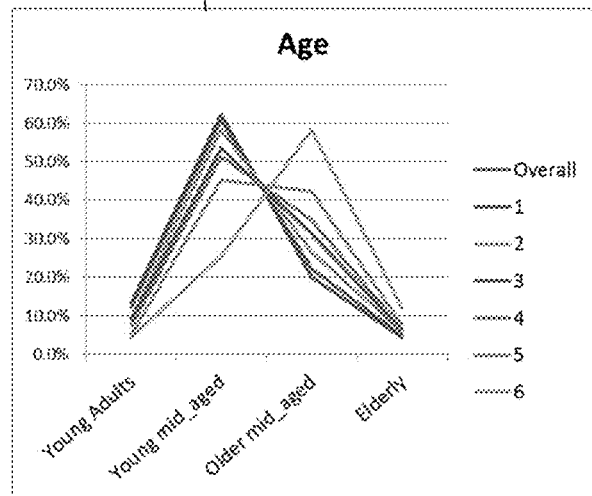
Figure 8:
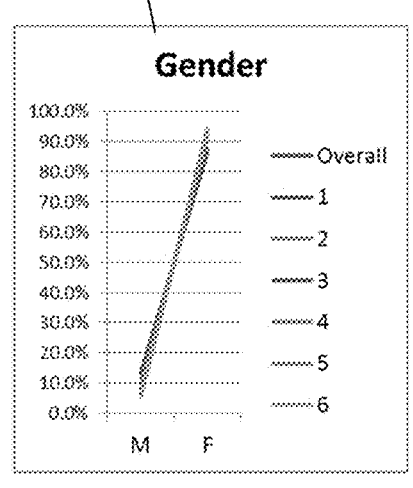
Figure 9:
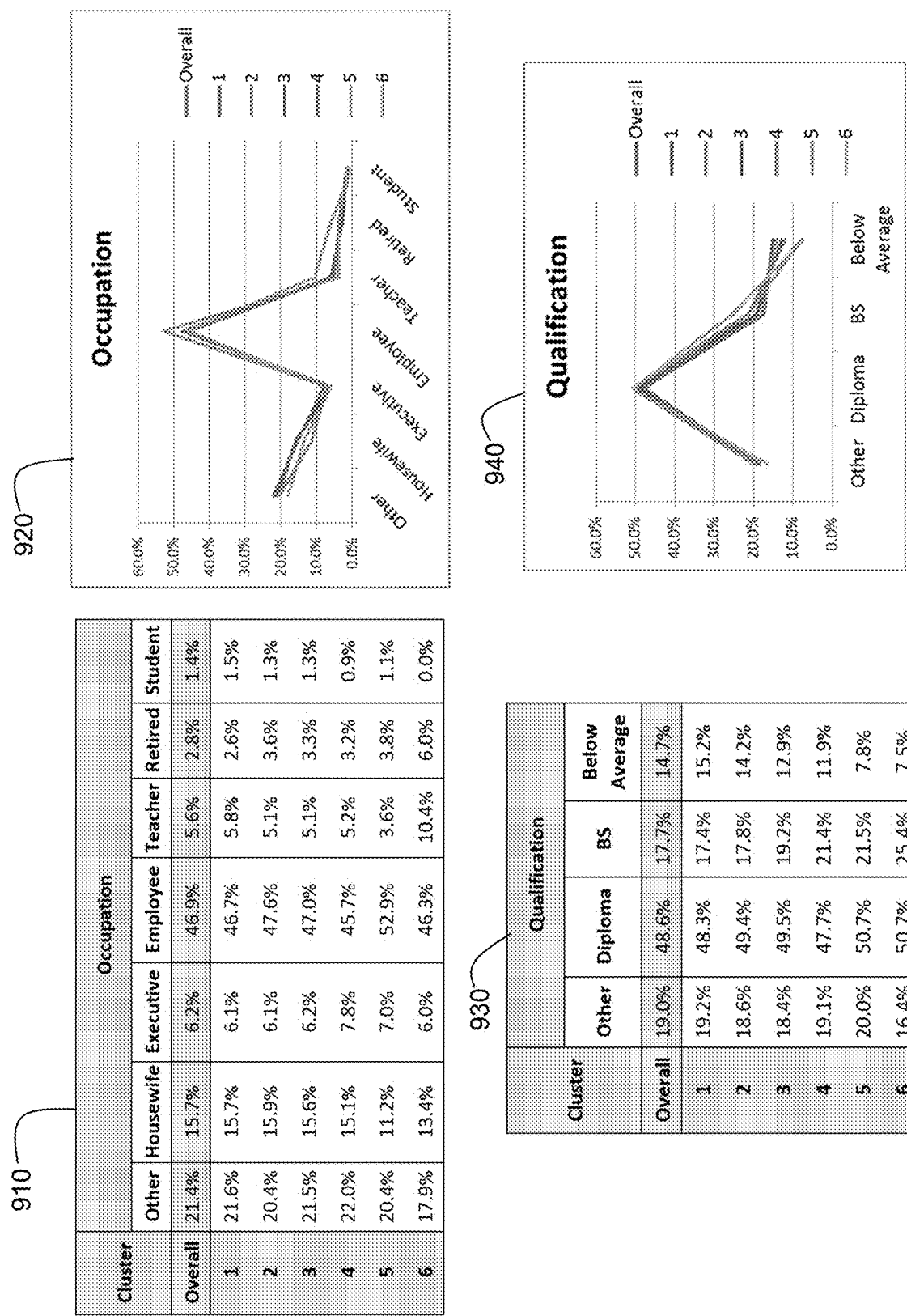
Figure 10:
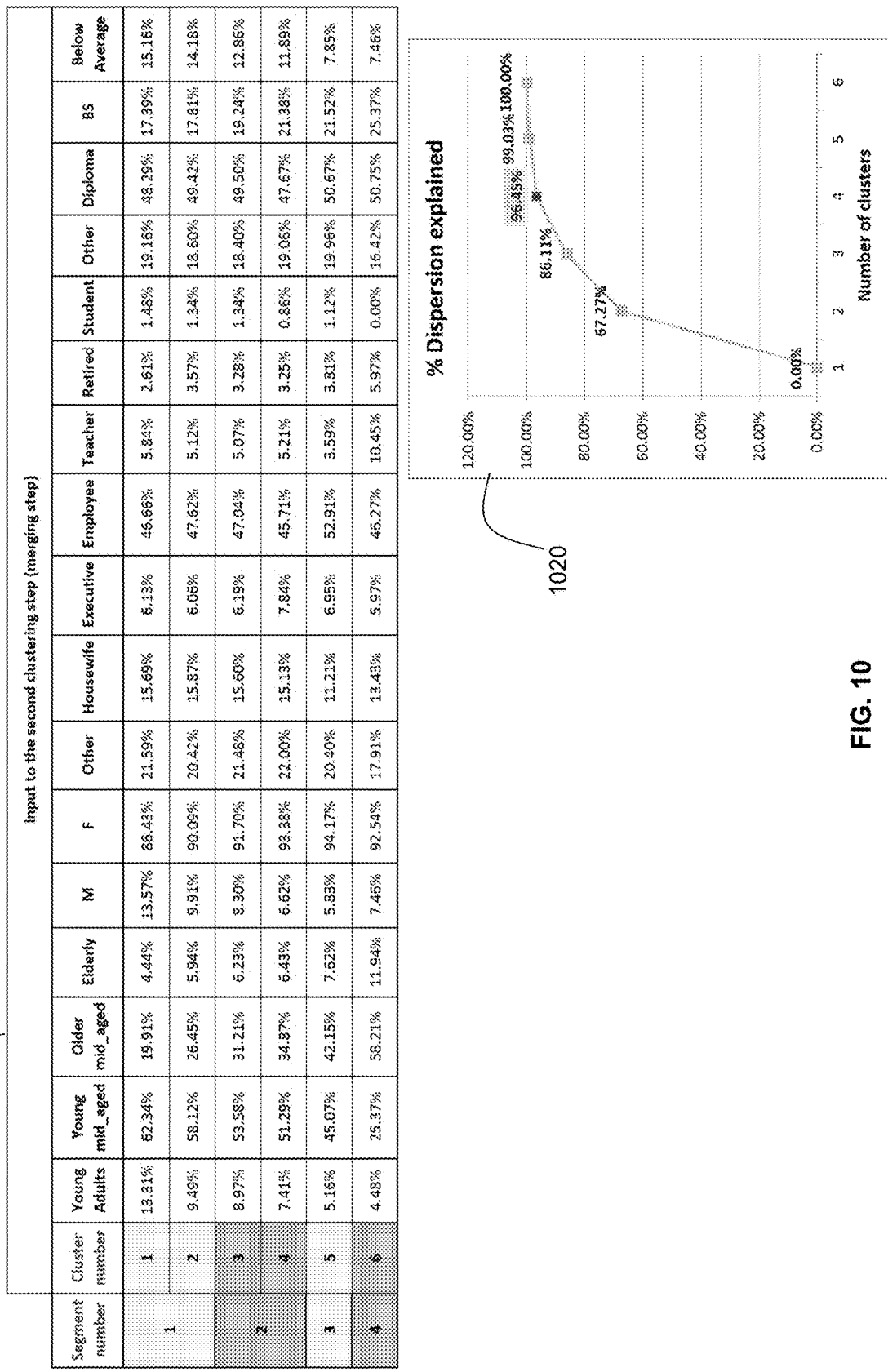

The method 200 effectively segments the customers associated with the attribute data (numerical demographic, categorical demographic, target demographic) into groups, where each group of customers exhibits a particular behavior or characteristic (i.e., a similar customer profile). For example, each final group (i.e., aggregated cluster) of the segmented customer data may represent a level of profitability. Thus, the segmented customer data may include one or more groups of segmented data/customers that are similar based on the target attribute. A first group may represent a most-profitable group of customers, a second group may represent a least-profitable group of customers, and a third group may represent a moderately-profitable group of customers. FIG. 3 illustrates in graph 300 such an example of segmented customer data generated by method 200 of FIG. 2. In FIG. 3, each "x" represents a customer in the most-profitable group 310, each "+" represents a customer in the moderately-profitable group 320, and each "Δ" represents a customer in the least-profitable group 330.

In one embodiment, a clustering technique known as K-means is used to perform the cluster analysis, where a number of desired clusters, K, can be specified. Initially, K number of centroids are established in a data domain, and each data point (e.g., representing a customer) is assigned to a closest centroid within the data domain. In accordance with one embodiment, the data domain is defined based on the nature of the congruent attribute data. The centroid of each cluster is updated based on the data points assigned to the cluster. The assigning and updating process is repeated until the centroids no longer change (or change within some specified tolerance). Other clustering techniques are possible as well, in accordance with other embodiments. An example of performing the clustering is presented below herein under the "Specific Example" section.

In this manner, customers can be segmented into groups where each group represents a different characteristic or profile (e.g., level of profitability) provided by the customers within each group. Both numerical and categorical demographic attribute data associated with the customers is taken into consideration when performing the segmenting process. By bringing the attribute data to a same numerical scale, a clustering technique can be employed to segment the customers.

A computerized management system can use the segmented customer data to control at least one enterprise function performed by the computerized management system. For example, an inventory allocation function can be controlled by the segmented customer data to first direct available inventory towards sales channels where customers in a most-profitable group shop, before directing inventory to other sales channels. Such a computerized management system may be an enterprise resource planning (ERP) system or an inventory management and demand forecasting system, for example. In one embodiment as described in the following actions of method 200, the segmented customer data may be used to control robots and/or inventory machines to identify, retrieve, and move/transport selected items/products to destination locations (e.g., sales channels).

Referring to FIG. 2, at block 260, in one embodiment, an electronic message is generated that includes either the segmented customer data (before aggregation) or data representing the aggregated customer groups. In another embodiment, the electronic message includes an order for a set of items based upon the segmented customer data. The order may include set of inventory items that are identified to be transported to selected sales channels/locations. The inventory items and/or selected sales channels are selected based at least in part on one group of the segmented customer data (e.g., the most profitable customer group) and data that identifies locations where this group shops. In one embodiment as described below, the electronic message is generated as (and/or includes) control instructions for a robotic mechanism of an inventory system.

At block 270, the electronic message may be transmitted (e.g., via network communications) to a remote computing system (e.g., a computerized management system) located at a warehouse or a sales channel to cause the remote computing system to perform at least one enterprise function. For example, the enterprise function may be an inventory allocation function, a demand forecasting function, or a market segmentation function.

At block 280, the electronic message including the order is sent to one of the retailer's warehouses (or fulfillment center), where warehouse-management software or similar inventory system receives the order. The systems at the warehouse fulfill the order by retrieving the items/units from a unit storage location, packaging the units, and preparing them for shipping. If the order is sent to the sales channel (retailer's store), the order is fulfilled at the store. In one embodiment, the systems are controlled at least in part by the instructions in the order.

The inventory systems may include, for example, automated robotic machines or mechanisms configured to locate and retrieve items from warehouse or store locations based on the order and/or rearrange items in different locations based on the order (e.g., add selected items, remove selected items, based on the items identified in the order). The retrieved items are delivered by the robotic mechanism to automated packaging mechanisms that package the retrieved items in the warehouse or transport the retrieved items to a different location.

At block 290, if the retrieved items are located at the warehouse, the retrieved items are transported to the sales channel (retailer's store). In another embodiment, if the retrieved items are at the retailer's store, the retrieved items are moved and delivered to the store's display area and placed on the display area for sale to the customers.

In one embodiment, the robotic mechanisms may include one or more robots configured to navigate throughout a given warehouse or store, locate and retrieve items, and carry items to a destination. Each robot may include at least a body structure, a power source, a control interface, a wired/wireless communication interface, a drive device to move the robot, a navigation device, one or more sensors, and/or a balance device. Of course, the robot may be configured in different ways and multiple different types of robots may be operating together in the robotic mechanism of the warehouse or store.

In one or more embodiments, the robotic mechanisms may include one or more of the following systems. Automated Guided Vehicles (AGVs) for transporting materials, supplies, and inventory within warehouse or store facilities. An AGV may be configured to autonomously navigate warehouse or store facilities by following defined routes marked by wires, magnetic strips, tracks, sensors embedded in the floor or other physical guides. The AGV may also be navigated by a defined map of the warehouse or store based on a coordinate system and a tracked location of the AGV. Cameras may also be used to navigate an AGV. Another robotic mechanism is Automated Storage and Retrieval Systems (AS/RS) which may include a group of computer-controlled systems that automate inventory management and store/retrieve goods on demand from storage locations in the warehouse or store. The AS/RS may operate either as cranes or shuttles on fixed tracks and can traverse product aisles and vertical heights to remove items or drop off items from storage. Another robotic mechanism is articulated robotic arms that are a type of pick-and-place robot. These arms can move, turn, grab/release, lift and move items with, for example, multi-jointed limbs used to manipulate products.

After the retrieved items are transported to a packaging area of the warehouse (block 280), the items for the order are packaged by an automated system. This may include cartonization software that determines quantity, size, and type of container required to package of the order, and/or bagging machines that help speed up packaging operations. As discussed above, after the retrieved items are transported to the sales channel (retailer's store), the retrieved items can then be transported to the display area of the store, and the retrieved items can be placed on a designated display area of the store.

The packaged order is transferred to a shipper, or if the retailer has its own shipment operation, then the retailer's own trucks will take the shipment. The status of the order is changed to "in transit" in the inventory-management system. The order arrives at the store it is destined for. Finally, at 295, the computerized management system software then updates the inventory position of the retrieved items at the sales channel.

With reference again to FIG. 2 and block 260, in another embodiment, an electronic message is generated for customers in a selected group from the segmented customer data, where the message is used to initiate an action from a customer. For example, the selected group is the most profitable customers that are identified from the segmented customer data. The electronic message may be generated with a link that is configured to provide network-accessible access to a selected website location over a network communication. The link and selected website location may include additional items and/or promotions that may entice and cause the customer to select and purchase additional items.

The electronic message including the link is transmitted to a remote device/account (e.g., via customer email address, text address, etc) associated with the customer. In response to selection of the link from a remote device, network access is established from the remote device to the selected website location and access is granted to the selected website location. The remote device is enabled to generate a display of items from the selected website location.

In another embodiment, the system may generate both types of electronic messages: a first message the includes the order and which is used to control a robotic mechanism, and a second message to one or more customers including a link that is sent to selected customers to access a website.

Details of One Algorithmic Embodiment

In one embodiment, the goal is to segment customers using demographic attributes based on sales data in a particular category. Input data includes target attribute values $A_T$ per customer over an interested time period (e.g., at least 3 months) and demographic attributes $A_1, \ldots, A_m$. The demographic attributes may be those demographic attributes that have previously been determined to be of highest importance or the most relevant, in accordance with one embodiment.

The following notations are used herein:
Cust: Set of all the customers
|Cust|: Total number of customers
$a_i^c$: Value of attribute $A_i$ for customer $c \in$ Cust
$a_{Wi}^c$: Weight of attribute $A_i$ for customer $c \in$ Cust
$V^c$: Vectorized attribute values for customer c
$|A_i|$: Number of distinct values of attribute $A_i$
$a_{ij}$: Value j of attribute $A_i$ from the output of the "Attribute Importance" algorithm, $j \in \{1, \ldots, |A_i|\}$
$A_i^W$: Weight vector for attribute $A_i$
$a_{ij}^W$: Value j of weight vector $A_i^W$, $j \in \{1, \ldots, |A_i|\}$
$P_k$: Customer profile for cluster k
$S_i$: Set of customers in segment i
$C_i^W$: Customer worth in segment i Algorithm Steps:

The algorithm is implemented in two stages: Stage 1: cluster generation, and Stage 2: cluster aggregation.

Stage 1: cluster generation

1) For each $A_i$, calculate the average value of the target attribute per person for all of the attribute values and construct the weight vector $A_i^W$ from the calculated averages. $A_i^W$ values are calculated by:

$$a_{ij}^W = \frac{\text{Sum}(a_T^c \mid a_i^c = a_{ij})}{\text{Count}(c \in Cust \mid a_i^c = a_{ij})} \text{ for } j \in \{1, \ldots, |A_i|\}$$

2) For each customer, find the corresponding weight vector value for the customer attribute values:

$$a_{Wi}^c = a_{ij \mid a_i^c = a_{ij}}^W \text{ for } i \in \{1, \ldots, m\}$$

3) Vectorize the target attribute value for each customer using the weighted average of the $a_{Wi}^c$ values. This vector, which is the numerical counterpart of the categorical values for each customer, is the input into the clustering process. The vector is calculated as:

$$V^c = \left[\frac{a_{Wi}^c}{\sum_{i \in \{1,\ldots,m\}} a_{Wi}^c} * A_T^c \text{ for } i \in \{1, \ldots, m\}\right], \text{ for } c \in Cust$$

4) Perform K-Means clustering on the customer vectorized values. In order to determine the number of clusters, clustering is performed for one (1) up to $k_{max}$ number of clusters, and the "relative dispersion explained" for each cluster number is calculated. The "relative dispersion explained" for k number of clusters is defined as:

$$\frac{\text{Dispersion for 1 cluser} - \text{Dispersion for k clusters}}{\text{Dispersion for 1 cluster}}.$$

The number k that corresponds to a less than 0.05 consecutive change in relative dispersion may be selected as the optimal number of clusters, denoted by $k_{opt}$.

Stage 2: cluster aggregation

1) Calculate the "customer profile" for each cluster. The "customer profile" for a cluster includes the set of normalized distributions of all the attributes, calculated based on the number of customers and their attribute values in that cluster. The customer profile has the dimension of $\Sigma_{i \in \{1, \ldots, m\}} |A_i|$ and is calculated by:

$$P_k = \left[\frac{\text{Count}(c \in Cust \mid a_i^c = a_{ij})}{\text{Count}(c \in Cust)} \text{ for } j \in \{1, \ldots, |A_i|\} \text{ and } i \in \{1, \ldots, m\}\right],$$

$$k \in \{1, \ldots, k_{opt}\}$$

2) Perform K-Means clustering on the set of cluster profiles of the $k_{opt}$ clusters. The goal of this step is to identify clusters with similar profiles. Execute K-Means for one (1) to $k_{opt}$ clusters, looking for the optimal number of clusters using the same method utilized in step 4 of stage 1. The resulting optimal number will be the final number of customer segments, denoted by $s_{opt}$.

3) Merge the customer clusters in step 1 according to the results in step 2, yielding the desired customer segments.

Stage 2 guarantees a unique profile for each segment, enabling the user to find the differentiating factors for each segment. For example, the differentiating factor for a cluster could be a low female percentage and high education.

Post-processing step: determine the "customer worth" in each segment by calculating the average per person value of the target attribute value in that segment:

$$C_i^W = \frac{\text{Sum}(a_T^c \mid c \in S_i)}{\text{Count}(c \in S_i)}.$$

Mapping the customer worth to the differentiating factors allows insights to be extracted from each segment. An example for an insight is: "the highest valued customers are females with high education".

Specific Example
Category: Women Knitwear
Target attribute: Women Knitwear sales dollars for one year
Demographic attributes: Age, Gender, Qualification, and Occupation.
Stage 1:
1) The only numerical attribute among the input attributes is Age, which is binned according to the retailer's instructions. All four of the attributes are chosen for segmentation. Attribute values are listed as follows:
Age: Young Adults, Young mid_aged, Older mid_aged, Elderly
Gender: M, F
Qualification: Below Average, Diploma, Bachelor's Degree, Other
Occupation: Employee, Housewife, Executive, Retired, Student, Teacher, Other.
$A_i^W$ values are then calculated for all of the attributes as shown in the tables 410-440 of FIG. 4.
2) For each customer, the corresponding attribute weights are selected. For example, the weights for customer #4, who is a female, elderly, housewife with a diploma degree, are highlighted in the tables 410-440 of FIG. 4 and shown in the table 500 of FIG. 5.
3) Knitwear sale for each customer is vectorized using the attribute weights. The vector for the same customer #4 with an overall purchase of $213 in the knitwear category is calculated as shown in the table 600 of FIG. 6.
4) K-Means clustering is performed on the vectorized values for all the customers. Each input data point is a vector corresponding to a particular customer and there are as many data points as the number of customers. Using the dispersion graph 700 shown in FIG. 7, the optimal number of clusters is calculated to be six (6).
Stage 2:
1) The cluster profile for each of the attributes in each cluster is derived. The results are shown in the tables 810 and 830 and the graphs 820 and 840 of FIG. 8, and in the tables 910 and 930 and the graphs 920 and 940 of FIG. 9. For each attribute/cluster combination, the numbers should add up to %100.
2) The customer profiles are then fed into K-Means clustering in another step to merge the clusters with similar customer profiles. The results are shown in the table 1010 and the graph 1020 of FIG. 10.

Figure 11:
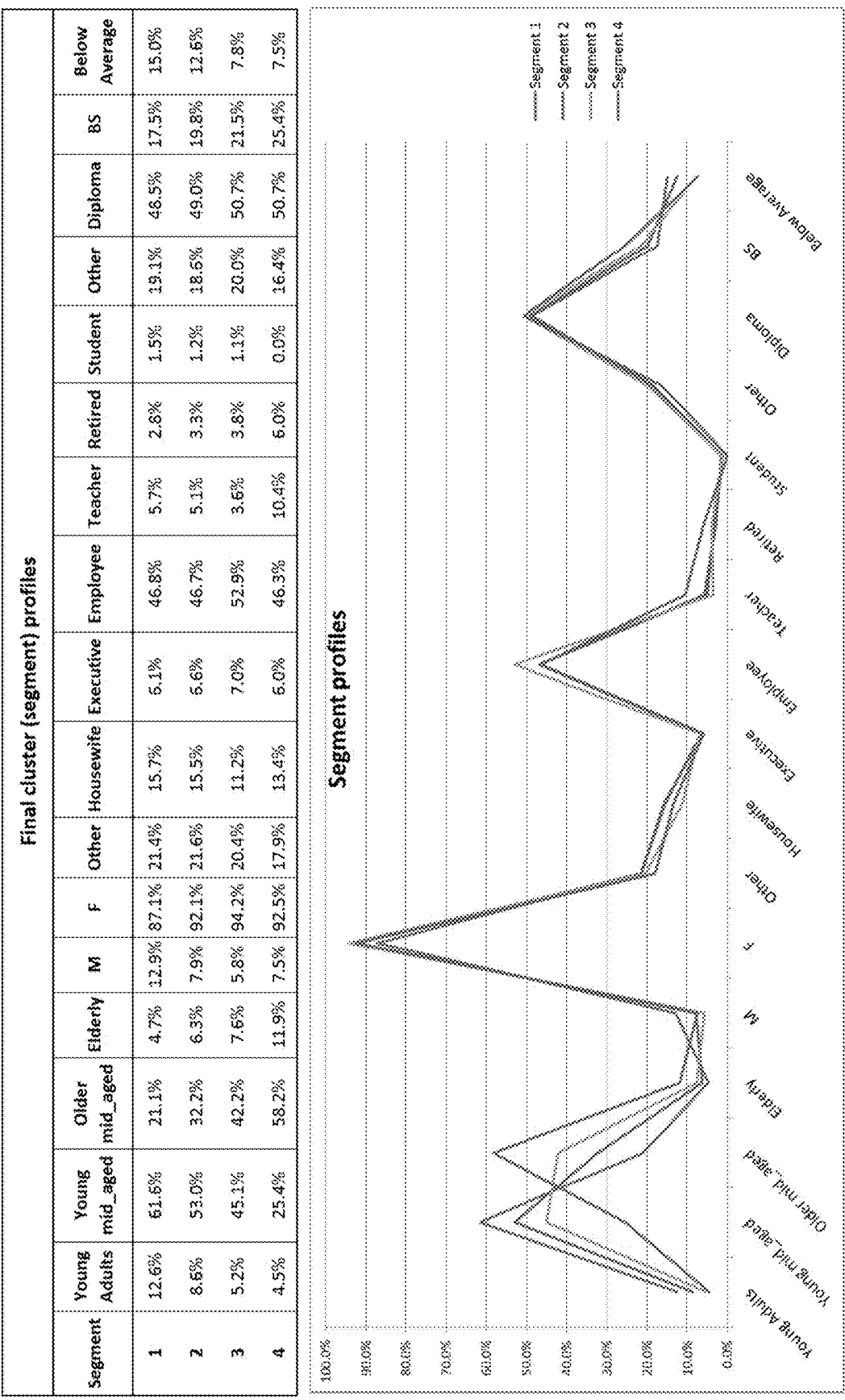

3) According to the results in step 2, clusters #1 and #2 are merged to form one segment. Clusters #3 and #4 are also merged to form another segment. Clusters #5 and #6 remain untouched and each will be considered as a separate segment. The final cluster profiles, shown in the table 1110 and chart 1120 in FIG. 11, are guaranteed to be different from each other, at least with respect to one attribute value.

Figure 12:
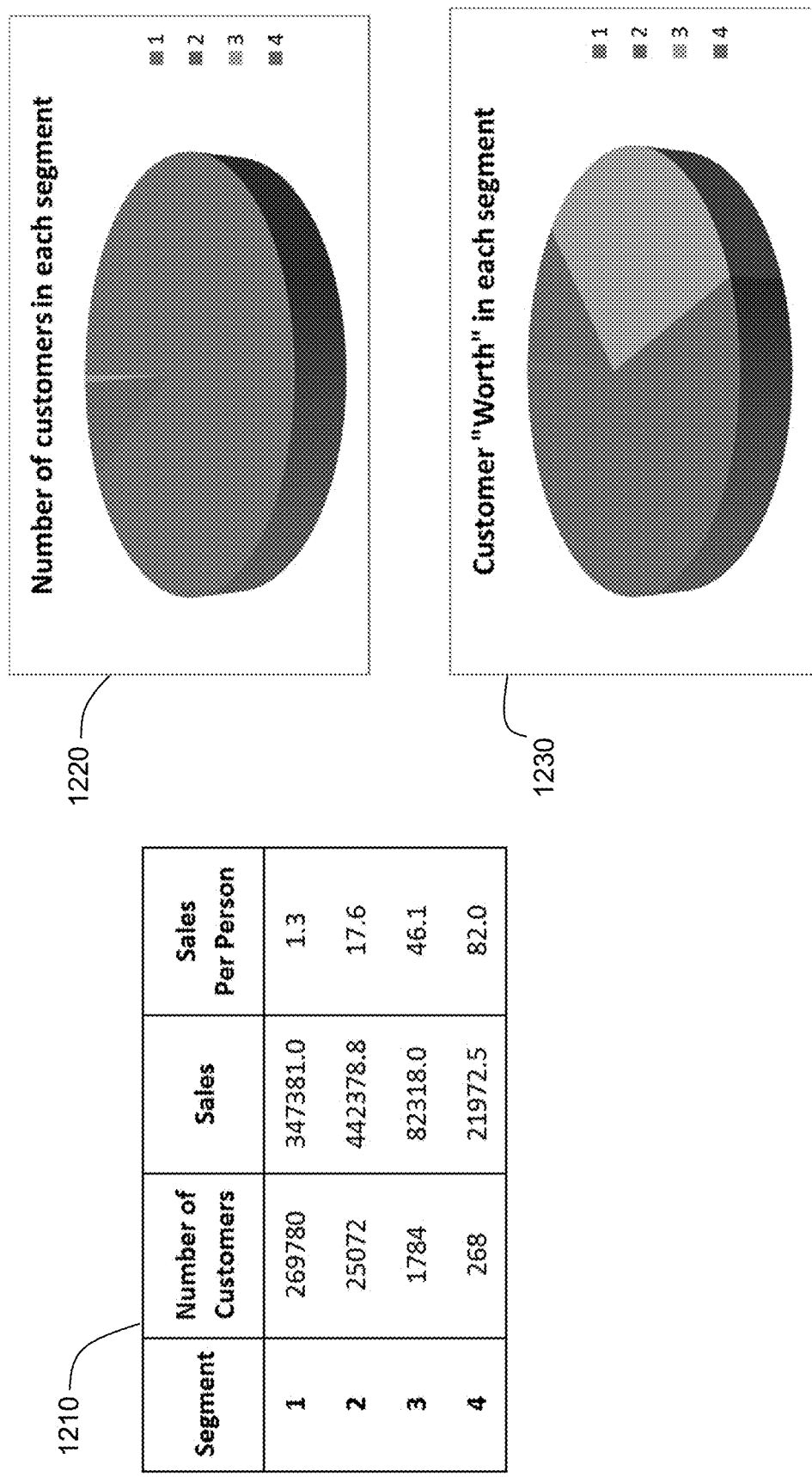

Post-processing: the relative number of customers in each cluster with their corresponding calculated "customer worth" is shown in the form of a table 1210 and pie charts 1220 and 1230 in FIG. 12. Several insights can be inferred from these results. For example, customers in cluster #4, who only contribute to one (1) percent of the total number of customers, have by far the highest value (worth) among the customers, and the most differentiating factor about them is their age (Older mid-aged).

Computing Device Embodiment

Figure 13:
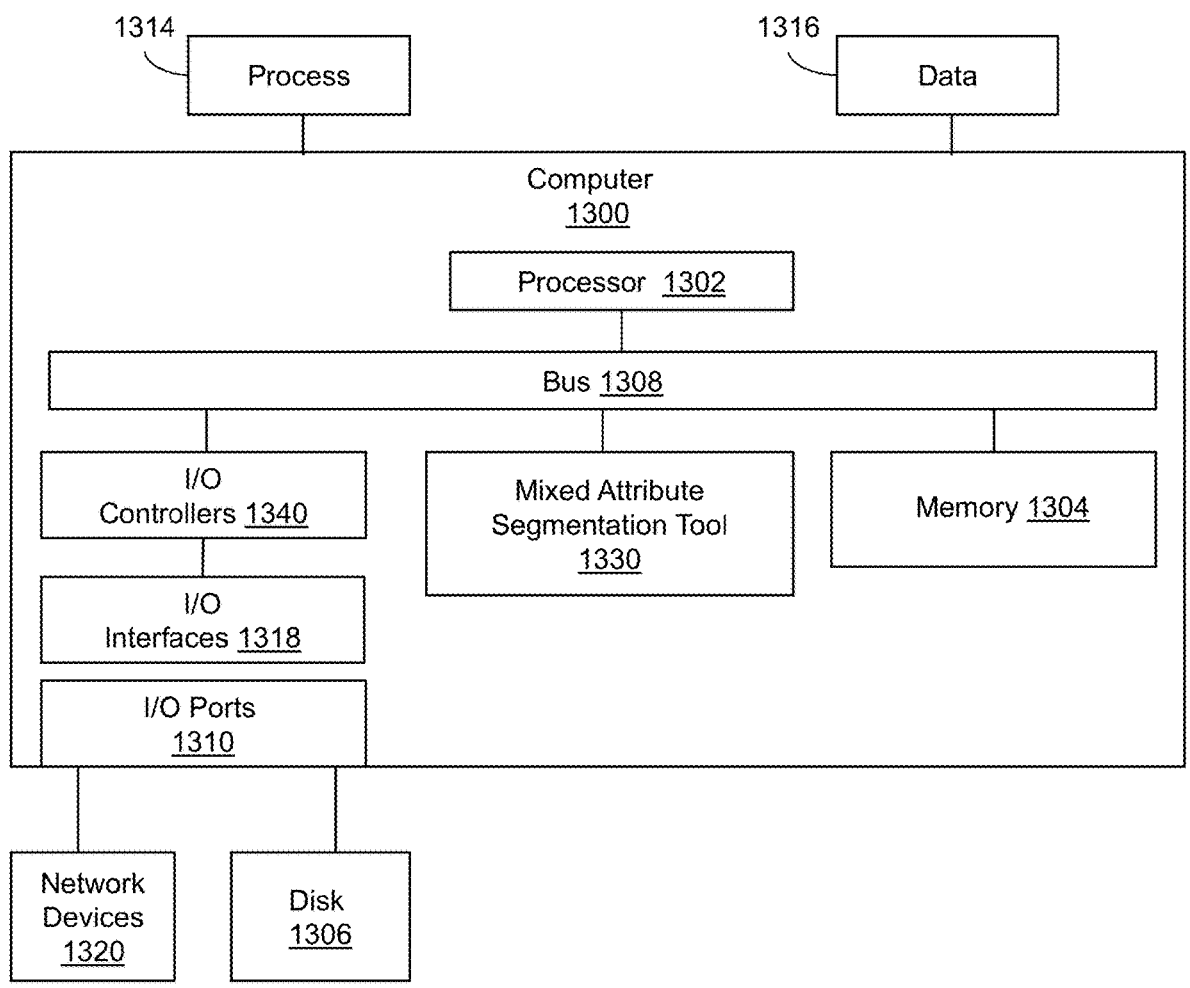
FIG. 13 illustrates one embodiment of a computing device upon which a mixed attribute segmentation module of a computing system may be implemented.

FIG. 13 illustrates an example computing device that is configured and/or programmed with one or more of the example systems and methods described herein, and/or equivalents. FIG. 13 illustrates one example embodiment of a computing device upon which an embodiment of a mixed attribute segmentation tool may be implemented. The example computing device may be a computer 1300 that includes a processor 1302, a memory 1304, and input/output ports 1310 operably connected by a bus 1308.

In one example, the computer 1300 may include mixed attribute segmentation tool 1330 (corresponding to mixed attribute segmentation tool 110 from FIG. 1) configured with a programmed algorithm as disclosed herein to transform and analyze demographic attribute data associated with customers and generate segmented customer data based on a target attribute (e.g., sales). In different examples, the tool 1330 may be implemented in hardware, a non-transitory computer-readable medium with stored instructions, firmware, and/or combinations thereof. While the tool 1330 is illustrated as a hardware component attached to the bus 1308, it is to be appreciated that in other embodiments, the tool 1330 could be implemented in the processor 1302, a module stored in memory 1304, or a module stored in disk 1306.

In one embodiment, tool 1330 or the computer 1300 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the generation of segmented customer data. The means may also be implemented as stored computer executable instructions that are presented to computer 1300 as data 1316 that are temporarily stored in memory 1304 and then executed by processor 1302.

Tool 1330 may also provide means (e.g., hardware, non-transitory computer-readable medium that stores executable instructions, firmware) for facilitating the generation of segmented customer data using both numerical and categorical demographic attribute data.

Generally describing an example configuration of the computer 1300, the processor 1302 may be a variety of various processors including dual microprocessor and other multi-processor architectures. A memory 1304 may include volatile memory and/or non-volatile memory. Non-volatile memory may include, for example, ROM, PROM, and so on. Volatile memory may include, for example, RAM, SRAM, DRAM, and so on.

A storage disk 1306 may be operably connected to the computer 1300 via, for example, an input/output interface (e.g., card, device) 1318 and an input/output port 1310. The disk 1306 may be, for example, a magnetic disk drive, a solid state disk drive, a floppy disk drive, a tape drive, a Zip drive, a flash memory card, a memory stick, and so on. Furthermore, the disk 1306 may be a CD-ROM drive, a CD-R drive, a CD-RW drive, a DVD ROM, and so on. The memory 1304 can store a process 1314 and/or a data 1316, for example. The disk 1306 and/or the memory 1304 can store an operating system that controls and allocates resources of the computer 1300.

The computer 1300 may interact with input/output devices via the i/o interfaces 1318 and the input/output ports 1310. Input/output devices may be, for example, a keyboard, a microphone, a pointing and selection device, cameras, video cards, displays, the disk 1306, the network devices 1320, and so on. The input/output ports 1310 may include, for example, serial ports, parallel ports, and USB ports.

The computer 1300 can operate in a network environment and thus may be connected to the network devices 1320 via the i/o interfaces 1318, and/or the i/o ports 1310. Through the network devices 1320, the computer 1300 may interact with a network. Through the network, the computer 1300 may be logically connected to remote computers. Networks with which the computer 1300 may interact include, but are not limited to, a LAN, a WAN, and other networks.

Systems, methods, and other embodiments have been described that are configured to segment customers, based on a target attribute, using both numerical and categorical demographic attribute data. In one embodiment, category transformation logic generates transformed demographic attribute data by transforming categorical demographic attribute data from a non-numerical form to a numerical form. Scaling conversion logic converts numerical demographic attribute data and the transformed demographic attribute data to a same numerical scale, based on target attribute data, to form congruent attribute data that is in a format that is compatible with performing a cluster analysis on the congruent attribute data. Cluster analysis logic performs the cluster analysis on the congruent attribute data to generate segmented customer data. The segmented customer data represents a segmenting of the customers and may be used to control an enterprise function performed by a computerized management system.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device to control a robotic mechanism, where the computing device includes at least a processor for executing instructions from a memory, the method comprising:

reading a computerized data structure, from a computerized memory via at least one processor, including a plurality of data records having numerical demographic attribute data, categorical demographic attribute data, and target attribute data associated with customers;

converting the categorical demographic attribute data from a non-numerical form to a numerical form having numerical values to generate converted categorical demographic attribute data;

converting the numerical demographic attribute data and the numerical values of the converted categorical demographic attribute data, via the at least one processor, to a same standard numerical scale, based at least in part on the target attribute data to form congruent demographic attribute data;

determining an average value of each of the target attribute data for each of the customers based upon the target attribute data associated with each of the customers;

creating a weight factor for each of the customers based upon the determined average value of each of the target attribute data;

vectorizing the determined average value associated with each of the customers using the weight factor associated with that particular customer;

performing a cluster analysis, via the at least one processor, on the congruent demographic attribute data having the same standard numerical scale and the customer vectorized determined average value for all of the customers to generate an order having a set of items based on the segmented customer data representing a segmenting of the customers;

generating a set of control instructions executable by robotic mechanisms that includes the order for the set of items based upon the segmented customer data;

transmitting, via network communications, the set of control instructions including the order to a robotic mechanism associated with an order fulfilment facility;

in response to receiving the set of control instructions by the robotic mechanism at the order fulfillment facility, automatically operating the robotic mechanism to fulfill the order by autonomously navigating through associated item storage locations and retrieving the set of items from the associated item storage locations based upon the set of control instructions;

transporting the retrieved set of items to a sales channel;

placing the retrieved set of items on a display area in the sales channel for sale to the customers; and updating an inventory position of the retrieved items at the sales channel.

2. The method of claim 1, wherein the converting to the same standard numerical scale forms congruent demographic attribute data being in a format compatible with performing a cluster analysis on the congruent demographic attribute data; and wherein the converting includes normalizing the numerical demographic attribute data and the numerical values of the converted categorical demographic attribute data and using weighting values associated with the target attribute data to bring both sets of congruent demographic attribute data to a comparable numerical dimension for the cluster analysis.

3. The method of claim 1, wherein the target attribute data comprises sales data.

4. The method of claim 1, wherein the numerical demographic attribute data includes at least one of age data, household size data, and income level data associated with the customers.

5. The method of claim 1, wherein the categorical demographic attribute data includes at least one of occupation data, gender data, and qualification data associated with the customers.

6. A computing system, comprising:

at least one processor connected to at least one memory;

a non-transitory computer-readable medium storing computer-executable instructions configured as one or more modules that, when executed by the processor, cause the computing system to:

facilitate reading of a plurality of data records including numerical demographic attribute data, categorical demographic attribute data, and target attribute data associated with customers;

generate converted categorical demographic attribute data by converting the categorical demographic attribute data from a non-numerical form to a numerical form of numerical values;

convert the numerical demographic attribute data and the numerical values of the converted categorical demographic attribute data to a same standard numerical scale, based at least in part on the target attribute data, to form congruent demographic attribute data;

determine an average value of each of the target attribute data for each of the customers based upon the target attribute data associated with each of the customers;

create a weight factor for each of the customers based upon the determined average value of each of the target attribute data;

vectorize the determined average value associated with each of the customers using the weight factor associated with that particular customer perform a cluster analysis on the congruent demographic attribute data having the same standard numerical scale and the customer vectorized determined average value for all of the customers to generate an order having a set of items based on the segmented customer data representing a segmenting of the customers;

generate a set of control instructions executable by robotic mechanisms that includes the order for the set of items based upon the segmented customer data;

transmit, via network communications, the set of control instructions including the order to a robotic mechanism associated with an order fulfilment facility;

in response to receiving the set of control instructions by the robotic mechanism at the order fulfillment facility, automatically operating the robotic mechanism to fulfill the order by autonomously navigating through a first location and retrieving one or more of the set of items from the first location and transporting the retrieved one or more of the set of items to a second location; and place the retrieved one or more of the set of items on a display area in the second location for sale to the customers.

7. The computing system of claim 6, further comprising a database device configured to store at least the numerical demographic attribute data, the categorical demographic attribute data, and the target attribute data.

8. The computing system of claim 6, wherein the segmented customer data represents a segmenting of the customers based on the target attribute data.

9. The computing system of claim 6, wherein the target attribute data comprises sales data.

10. The computing system of claim 6, further comprising a visual user interface module configured to provide a graphical user interface to display the segmented customer data.

11. The computing system of claim 10, further comprising a display screen configured to display and facilitate user interaction with at least the graphical user interface.

12. A non-transitory computer-readable medium storing computer-executable instructions that, when executed by a computer including a processor, cause the computer to perform functions configured by the computer-executable instructions, wherein the instructions comprise:

reading a plurality of data records that include (i) numerical demographic attribute data having first numerical values and (ii) categorical demographic attribute data having non-numerical values, wherein the plurality of data records is associated with a set of customers;

converting the non-numerical values of the categorical demographic attribute data to a numerical form of second numerical values to generate converted demographic attribute data;

converting the first numerical values of the numerical demographic attribute data of the customers and the converted demographic attribute data to a same standard numerical scale, based at least in part on associated target attribute data, to form congruent demographic attribute data;

determining an average value of each of the target attribute data for each of the customers based upon the target attribute data associated with each of the customers;

creating a weight factor for each of the customers based upon the determined average value of each of the target attribute data;

vectorizing the determined average value associated with each of the customers using the weight factor associated with that particular customer;

segmenting the customers by performing the cluster analysis on the congruent demographic attribute data having the same standard numerical scale and the customer vectorized determined average value for all of the customers to generate an order having a set of items based on the segmented customer data representing a segmenting of the customers;

generating a set of control instructions executable by robotic mechanisms that includes the order for the set of items based upon the segmented customer data;

transmitting, via network communications, the set of control instructions including the order to a robotic mechanism associated with an order fulfilment facility;

in response to receiving the set of control instructions by the robotic mechanism at the order fulfillment facility, automatically operating the robotic mechanism to fulfill the order by autonomously navigating through associated item storage locations and retrieving the set of items from the associated item storage locations based upon the set of control instructions;

transporting the retrieved set of items to a sales channel;

placing the retrieved set of items on a display area in the sales channel for sale to the customers; and updating an inventory position of the retrieved items at the sales channel.

13. The non-transitory computer-readable medium of claim 12, wherein the instructions further include instructions for reading the categorical demographic attribute data, the numerical demographic attribute data, and the target attribute data from a database device and inputting the categorical demographic attribute data, the numerical demographic attribute data, and the target attribute data into at least one data structure stored in a memory of the computer.

14. The non-transitory computer-readable medium of claim 12, wherein the instructions further include instructions for:

performing an aggregation on the segmented customer data to generate final groups of customers by calculating a customer profile for each segment of customers;

performing the cluster analysis on the customer profile for each segment of customers; and merging each segment of customers based on the cluster analysis to form aggregated clusters, wherein each aggregated cluster represents a different characteristic or profile provided by the customers within each aggregated cluster.

15. The non-transitory computer-readable medium of claim 12, wherein the instructions further include instructions for:

generating a second electronic message that includes a link that is configured to provide network-accessible access to a selected website location over the network communications in response to the link being selected;

transmitting the second electronic message including the link to remote devices associated with the segmented customers based on the target attribute data;

in response to selection of the link by at least one of the segmented customers, establishing network access between a remote device associated with the at least one of the segmented customers and the selected website location and granting access to the selected website location; and generating a display of items from the selected website location on the remote device associated with the at least one of the segmented customers.

* * * * *

UNITED STATES PATENT AND TRADEMARK OFFICE
CERTIFICATE OF CORRECTION

| | |
|---|---|
| PATENT NO. | : 11,803,868 B2 |
| APPLICATION NO. | : 17/307099 |
| DATED | : October 31, 2023 |
| INVENTOR(S) | : Hajian |

It is certified that error appears in the above-identified patent and that said Letters Patent is hereby corrected as shown below:

In the Specification

In Column 1, Line 10, delete "14/963,858" and insert -- "14/963,858" --, therefor.

In Column 5, Line 46, delete "R" and insert -- β --, therefor.

Signed and Sealed this
Twenty-fifth Day of June, 2024

Katherine Kelly Vidal
*Director of the United States Patent and Trademark Office*